United States Patent [19]

Takano

[11] 4,306,262
[45] Dec. 15, 1981

[54] ROTARY CARRIER FOR CARRYING ROTARY MAGNETIC HEADS

[75] Inventor: Takashi Takano, Yokohama, Japan

[73] Assignee: Victor Company of Japan, Ltd., Yokohama, Japan

[21] Appl. No.: 116,918

[22] Filed: Jan. 30, 1980

[30] Foreign Application Priority Data

Feb. 7, 1979 [JP] Japan ................................. 54-13020

[51] Int. Cl.³ .................. G11B 15/60; G11B 5/10; G11B 5/48; G11B 21/20
[52] U.S. Cl. .............................. 360/130.24; 360/104; 360/129
[58] Field of Search .................... 360/104, 129, 130.24

[56] References Cited

U.S. PATENT DOCUMENTS 3,286,041 11/1966 Nishiwaki ........................ 360/129

Primary Examiner—Robert S. Tupper

[57] ABSTRACT

A rotary magnetic head carrier comprises a rotary structure having a cylindrical outer peripheral surface and formed to have at least one cutout or recess into which at least one part of a rotary magnetic head to be mounted on and held by the carrier is fitted. The recess has an opening part at the outer peripheral surface of the rotary structure. Tip edge parts of two side parts disposed on opposite sides of the opening part of the recess and defined by and interposed between the outer peripheral surface and the inner surface of the recess are deformed by pressing inwardly from the outer peripheral surface so as not to project outwardly therefrom.

8 Claims, 11 Drawing Figures

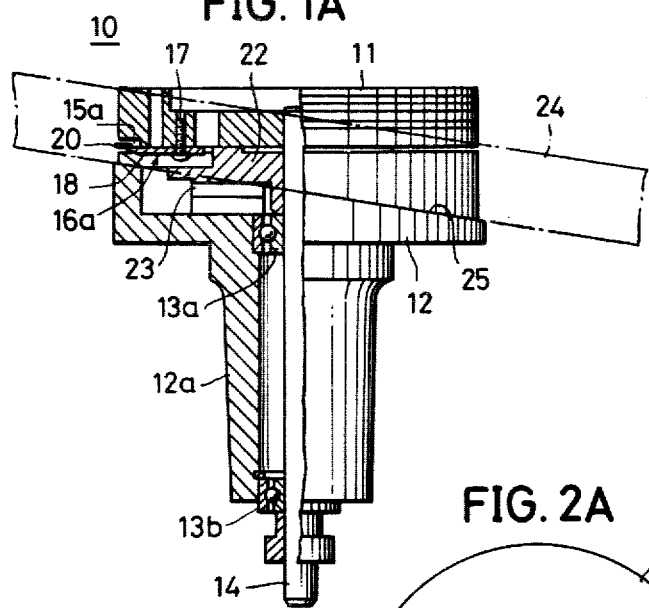
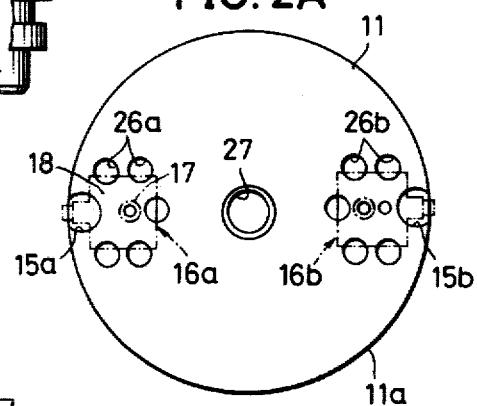
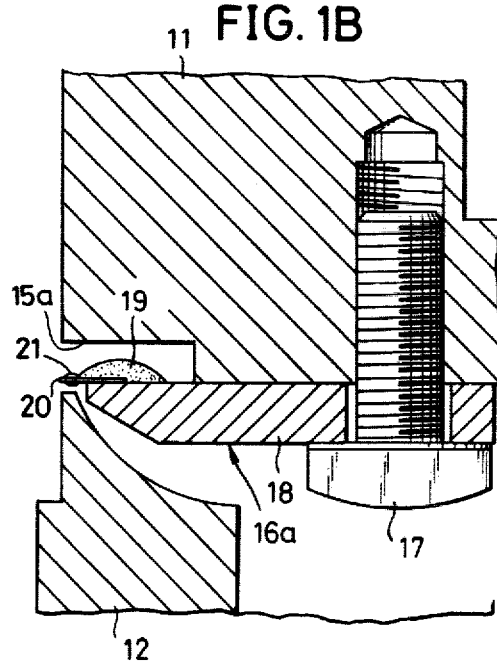

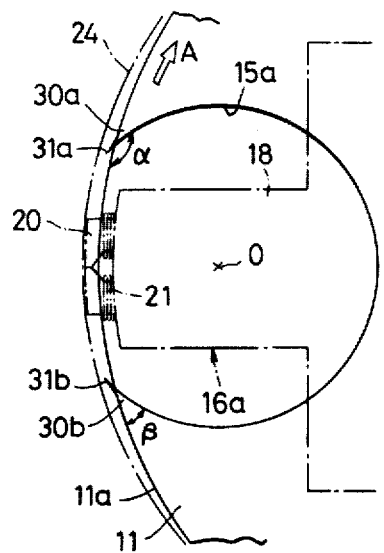
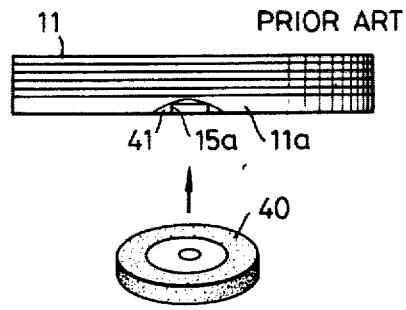
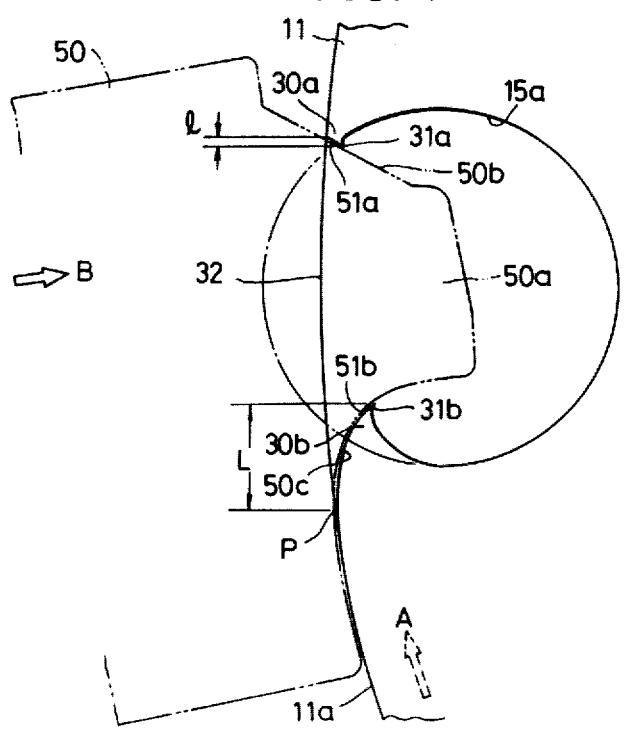

ROTARY CARRIER FOR CARRYING ROTARY MAGNETIC HEADS

BACKGROUND OF THE INVENTION

The present invention relates generally to structures for carrying rotary magnetic heads (hereinafter referred to as rotary magnetic head carrier(s)) such as rotary guide drums, rotary discs, and the like, which carriers hold rotary magnetic heads mounted thereon and rotate unitarily therewith. More particularly, the invention relates to a rotary magnetic head carrier having improved shapes of the outer edge parts on the opposite sides of each recess or cutout in which the head tip of a rotary magnetic head is fitted.

In general, in an apparatus for recording and/or reproducing a video signal on and/or from a magnetic tape by means of rotary magnetic heads (hereinafter referred to as a "VTR" apparatus), the above mentioned magnetic heads are mounted on and held or carried by a rotary structure such as a rotary guide drum or a rotary disc, rotating between a pair of fixed guide drums, and rotate unitarily with the rotary structure. A magnetic head assembly of this kind, in general, comprises a support plate to be mounted on the rotary structure constituting a rotary magnetic head carrier and a head tip comprising a core mounted on the outer end of the support plate and a coil wound around the core. The head tip is secured to the support plate with an adhesive, for example. Recesses or cutouts are provided in the rotary structure. A head tip and the adhesive, in a swollen state, are fitted in each recess when the support plate of the magnetic head is mounted on the rotary structure.

The recesses in the rotary structure desirably facilitate the forming operation. Small size openings of each recess, at the outer peripheral surface of the rotary structure, are fulfilled as requirements. The small size openings are desirable so that the gaps on both sides of the head tip at the outer peripheral surface of the rotary structure may be narrow.

Accordingly, a method of forming the recesses while satisfying the above stated conditions has been developed. This method comprises bringing a rotating cutter of a rod shape into contact with the rotary structure at a position such that the center of rotation of the cutter is at a distance which is less than the radius of rotation of the cutter from the outer peripheral surface of the rotary stucture and machining one end surface of the rotary structure by a specific dimension. By this method, a recess is formed with a shape which is a circle with a part thereof cut away and thus has a small opening at the outer peripheral part of the rotary structure. The recess becomes wider at its inner portion.

At the time of this machining to form the recess, the opposite side parts of the recess become very thin at the outer peripheral part of the rotary structure. Minute edge projections such as burrs are produced. If these minute projections are not removed, they will scratch or peel off the magnetic layer of the magnetic tape when the rotary structure rotates to cause the magnetic heads to scan the magnetic tape. When the magnetic tape is damaged in this manner, dropouts will occur in the reproduced signals. Furthermore, the magnetic particles thus peeled off adhere to the magnetic tape and magnetic heads, and this also is a cause of dropout. As a consequence, there are undesirable occurrences which seriously impair the recorded and reproduced signal.

Accordingly, buffing has been carried out to remove the above mentioned minute projections. However, in order to avoid, as much as possible, deforming parts of the outer peripheral surface of the rotary structure other than the recesses and to retain as much as possible the true circularity of the rotary structure, it is necessary to bring the rotating buffing tool into contact therewith in an oblique direction, relative to the outer peripheral surface and end surface of the rotary structure, thereby to remove the minute projections by buffing. However, by this method, even parts which do not require buffing in the vicinity of the opening of the recess at the outer peripheral surface of the rotary structure are polished into an arcuate shape, and the true circularity of the outer peripheral surface is impaired. Furthermore, it is difficult to carry out this buffing work automatically; therefore, it is usually carried out manually. For this reason, there is much deviation in this buffing work, and the accuracy is poor. In addition, there are other problems such as the need for skilled labor in this work.

Furthermore, in the case where materials such as chromium oxide are used in the polishing process, there are further problems such as the necessity of installing processing equipment for preventing environmental pollution and high production cost.

SUMMARY OF THE INVENTION

Accordingly, it is a general object of the present invention to provide a novel and useful rotary magnetic head holder or carrier in which the above described problems have been solved.

Another and specific object of the invention is to provide a rotary magnetic head carrier in which minute projections produced at the time of the forming of the recesses (cutouts) into which the head tips of the magnetic heads are fitted are pressed and deformed inwardly from the outer peripheral surface of the rotary structure. By this feature of the rotary magnetic head carrier of the invention, minute projections such as burrs are prevented from contacting the magnetic tape, whereby problems such as dropout and a damaging of the magnetic tape do not arise. Furthermore, there is almost no impairment of the true circularity of the rotary magnetic head carrier by the above mentioned deforming process. Moreover, this deforming work does not require any skilled labor whatsoever and can be easily carried out in an automatic machine.

Still another object of the invention is to provide a rotary magnetic head carrier in which, of the two side parts on opposite sides of the opening of each recess at the outer peripheral surface, the side part on the trailing side as considered with respect to the rotating direction of the carrier (that is, the side directed in the biting-in direction relative to the magnetic tape) is so deformed as to have a curved surface of a shape such as to guide the magnetic tape smoothly to the outer peripheral surface of the holder.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 1A is a side view, with a portion cut away and parts shown in longitudinal section, of a guide drum assembly in which one embodiment of the rotary magnetic head carrier according to the present invention is applied;

FIG. 1B is an enlarged partial side view showing one part of FIG. 1A;

FIGS. 2A and 2B are respectively a bottom view and an enlarged bottom view of one part of the rotary guide drum;

FIG. 3 is a side view for a description of a process for trimming burrs of a rotary guide drum known heretofore;

FIG. 4 is a bottom view for a description of a method of fabricating a rotary guide drum as one embodiment of the rotary magnetic head carrier according to the invention;

DETAILED DESCRIPTION

Figure 5:
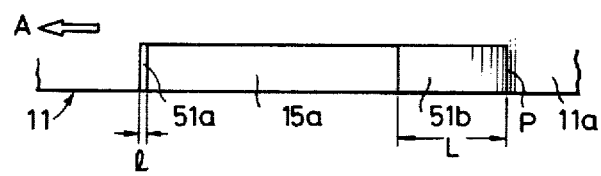
FIG. 5 is a front view of a recessed part of the rotary guide drum shown in FIG. 4.

A guide drum assembly of a VTR apparatus in which the embodiment of the present invention is applied is shown in FIG. 1A. The guide drum assembly 10 comprises, essentially, a rotary guide drum 11 constituting one embodiment of the rotary magnetic head carrier according to the invention and a stationary or fixed guide drum 12 positioned thereunder. On the lower side of the fixed guide drum 12, a housing part 12a is formed integrally and coaxially therewith. This housing part 12a has a hollow interior, in which are supported bearings 13a and 13b coaxially aligned with the fixed guide drum 12. A rotary shaft 14 extends coaxially through the centers of the fixed guide drum 12 and the housing part 12a and is rotatably supported by the bearings 13a and 13b. The rotary guide drum 11 is coaxially mounted on a flywheel 22 coaxially fixed to the rotary shaft 14. The rotary shaft 14 is rotated by a head motor (not shown) at a specific rotational speed of, for example, 30 revolutions per second (rps.)

In the lower surface part of the rotary guide drum 11 and at the outer peripheral edge thereof, a pair of recesses (cutouts) 15a and 15b, described hereinafter, are formed at diametrically opposite positions as shown in FIG. 2A in the case where the VTR apparatus is of the two-head type. Magnetic head assemblies 16a and 16b are mounted at positions respectively corresponding to the recesses 15a and 15b at the lower surface part of the rotary guide drum 11. As shown in FIG. 1B, the magnetic head assembly 16a comprises a support plate 18 disposed with its upper surface in intimate contact with the lower surface of the rotary guide drum 11 and thus secured by a screw 17 and a core (head tip) 20 fixed to upper surface of the outer end of the support plate 18 by an adhesive 19. A coil 21 is wound around the core 20. The part of the core 20 and the adhesive 19 on the upper surface of the support plate 18 is accommodated in the recess 15a. The magnetic head assembly 16b is of the same construction.

An annular rotary transformer 23, which is interposed between the aforementioned flywheel 22 and fixed guide drum 12, has a rotatable part secured coaxially to the flywheel 22 and a stationary part secured coaxially to the fixed guide drum 12. A lead 25 for guiding a magnetic tape 24 is helically formed around one part of the outer peripheral surface of the fixed guide drum 12. Further, as shown in FIG. 2A, holes 26a and 26b for position adjustment are drilled in the rotary guide drum 11 on the sides of the mounting positions of the magnetic head assemblies 16a and 16b. Eccentric pins for adjustment of the positions of the magnetic head assemblies 16a and 16b are inserted into these holes 26a and 26b in an assembling process. In addition, a hole 27 for receiving the rotary shaft 14 is formed in the center of the rotary guide drum 11.

As it is guided by the lead 25 of the guide drum assembly 10 of the above described construction, the magnetic tape 24 travels in wrapping contact around the guide drum over an angular expanse thereof which is slightly greater than one half of the circumference thereof. As the rotary guide drum 11 rotates, a video signal is recorded on or reproduced from the magnetic tape 24 along oblique tracks alternately by the magnetic head assemblies 16a and 16b.

Next, the manner in which the recess 15a (or 15b) are formed will be described. First, a rod cutter of a rotating radius R is brought into perpendicular contact with the lower surface of the rotary guide drum 11 made of, for example, an aluminum alloy. Machining is carried out at a position where the distance between the rotational center O of the cutter and the outer peripheral surface of the rotary guide drum is less than the above mentioned radius R thereby to cut a recess to a depth (in a direction parallel to the rotational axis of the rotary guide drum) of approximately 1 mm., for example.

By this machining, the recess 15a, having a shape in plan view of a circle with a part thereof cut away as shown in FIG. 2B is formed. Because the recess 15a is of this shape, its inner portion is spacious, whereby the mounting of the magnetic head assembly is facilitated, the core and other parts being easily inserted into this recess. Yet, the gaps on both sides of the core 20 of the magnetic head assembly 16a of the opening in the outer peripheral surface of the rotary guide drum 11 are small.

During this machining, the opposite side parts 30a and 30b of the opening of the recess 15a at the outer periphery of the rotary guide drum 11 become thinner toward their edges, which thus have a sharp edge. For this reason, minute projections 31a and 31b such as very thin burrs projecting outward from the outer peripheral surface 11a of the rotary guide drum 11 are formed at the sharp edges of the side parts 30a and 30b. Although the outer end of the core 20 is projecting slightly outward beyond the rotary guide drum 11, the minute projections 31a and 31b contact the magnetic tape 24 when the rotary guide drum 11 is rotated in the arrow direction A, for example, and the core 20 moves relatively to the magnetic tape 24. Consequently, if the projections 31a and 31b produced by the machining for forming the recess 15a are left as they are, they will abrade of scuff the magnetic surface of the magnetic tape 24.

Abrasion of scuffing of the magnetic surface of the magnetic tape 24 will cause scratches on the magnetic surface. Furthermore, the magnetic particles thus scratched off will adhere to parts such as the other parts of magnetic surface and the magnetic head core and give rise to dropout. As a result of an examination of the adhesion of the magnetic particles to the projections 31a and 31b, it was found that the quantity of the magnetic particles adhering to the projection 31b was greater than the quantity of magnetic particles adhereing to the projection 31a. This phenomeon may be attributed to the following reason. If the rotary guide drum 11 rotates in the arrow A direction, the angles formed between the inner surface of the side part 30a and the outer peripheral surface 11a, the angle (relief angle) α on the side opposite to the direction of the arrow A is an obtuse angle, and the projection 31a is directed toward the relief direction relative to the magnetic tape 24. In contrast, of the angles formed between the inner surface of the side part 30b and the outer peripheral surface 11a, the angle (incidence angle) β on the side opposite to the arrow direction A is an acute angle, and the projection 31b is directed in a biting-in direction relative to the magnetic directed in a biting-in direction relative to the magnetic tape 24.

Since, in general, the linear velocity of the outer peripheral surface 11a of the rotary guide drum 11 is much higher than the traveling speed of the magnetic tape 24, the difference between the degrees of scratching damage of the magnetic tape 24 due to the projections 31a and 31b is determined by the rotational direction of the rotary guide drum 11 and is not influenced by the direction of travel of the magnetic tape.

Heretofore, it has been the general practice to bring a rotating buffing wheel (or unwoven fabric) from an oblique direction relative to the peripheral surface and lower surface of the rotary guide drum 11 as indicated in FIG. 3 into contact with the outer peripheral surface 11a of the rotary guide drum 11 in the vicinity of the opening of the recess 15a thereby to abrade and remove the projections 31a and 31b. However, when buffing is applied to the entire neighborhood of the opening of the recess 15a in this manner, although the projections are polished and removed, a part of the outer peripheral part 11a in the vicinity of the opening is polished into an arcuate shape, and a useless polished surface 41, which is bisymmetric and is recessed from the outer peripheral surface 11a, is formed. As a result, the true circularity of the outer peripheral surface 11a is disadvantageously lost. Furthermore, despite the fact that the projection 31a requires less processing than the projection 31b, the side parts 30a and 30b are equally polished. For this reason, the side part 30a is excessively machined.

According to the present invention, the projections 31a and 31b formed by the machining to form the recesses 15a (or 15b) are processed without entailing the above described problem. After the recess 15a has been formed by machining, the tip part 50a of a punch tool 50 is fitted from the outer side of the rotary guide drum 11 into the opening of the recess 15a at the outer peripheral surface as shown in FIG. 4 and pressed in the arrow B direction relative to the rotary guide drum.

The two opposite sides of the tip part 50a of the punch 50 have the following shapes. In the illustrated embodiment of the invention, of these two opposite sides of the tip part 50a, the side surface part 50b contacting the side part 30a for the two side parts of the recess of the rotary guide drum is a substantially straight-line part which is so inclined that the tip part is tapered, that is, becomes thinner toward the extreme tip. Of the two side parts of the tip part 50a, the side surface part 50c contacting the side part 30b for the recess is a curved part of decreasing width toward the extreme tip. The curved part 50c in the vicinity of its outer side end part has a curve smoothly joining a curved part conforming to the outer peripheral surface 11a of the rotary guide drum 11.

The punch 50 is pressed with a pressure, for example, of 10 to 15 kg./mm.², in the arrow B direction up to the position indicated in FIG. 4. During this action, the tip of the side part 30a is deformed toward the inner side (inward of the recess 15a) by a relatively small dimension 1 by the side surface part 50b of the punch tip part 50a, and the projection 31a is deformed by being folded inwardly from the outer peripheral surface 11a. As a consequence, a deformed surface 51a is formed. Simultaneously, the side part 30b is deformed inwardly into a shape having a smooth curve over a dimension L which is greater than the above mentioned dimension 1, the deformation being made by the side surface part 50c of the punch tip 50a. Thus, a deformed surface 51b is formed along the smooth curve. As a result, the projection 31b is deformed to a position which is retracted 0.3 to 0.4 mm., for example, inwardly from the outer peripheral surface 11a. The recess 15a is shown in front view in FIG. 5.

In this case, the outer surface of the side part 30b after deformation has a curved shape conforming to the side surface part 50c for the punch 50. The tangent at a point P where the deformation begins with regard to the side part 30a coincides with the tangent at a point in the same position as the point on the outer peripheral surface 11a.

The side part 30a and the projection 31a are directed in the relief direction with respect to the arrow A direction of rotation of the rotary guide drum 11. For this reason, the projection 31a cannot contact and damage the magnetic tape even with the small dimension 1 of the deformed surface 51a as long as the projection 31a is deformed inwardly from the outer peripheral surface 11a. Furthermore, since the dimension 1 of the deformed surface 51a is small, the true circularity of the outer peripheral surface 11a of the rotary guide drum 11 is impaired only very slightly.

On the other hand, the side part 30b and the projection 31b directed in the biting-in direction with respect to the rotation in the arrow A direction of the rotary guide drum are deformed inwardly with a curved surface 51b smoothly joining the outer peripheral surface 11a. For this reason, despite the fact that the side part 30b and the projection 31b are directed in the direction for biting into the magnetic tape, the projection 31b cannot contact the magnetic tape. Moreover, the part of the magnetic tape contacting the side part 30b is smoothly guided toward the outer peripheral surface 11a along the curved surface 51b. Accordingly, the magnetic tape is not damaged in any manner whatsoever.

While the side surface part 50b of the above described punch 50 is of straight-line shape, it may be somewhat curved.

Furthermore, finish machining of the entire outer peripheral surface 11a of the rotary guide drum may be carried out after the process of deforming by pressing with the punch 50.

Figure 6A:
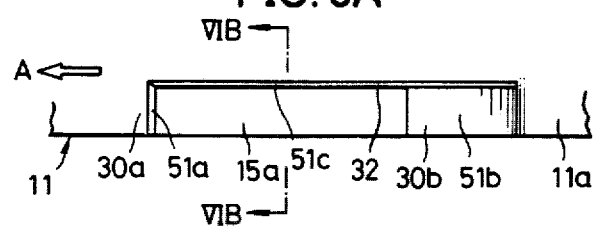
FIG. 6A is a front view of a modification of the recessed part of the rotary guide drum.
Figure 6B:
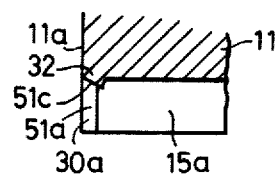
FIG. 6B is a section taken along the line VIB—VIB in FIG. 6A.

A modification of the above described embodiment of the invention will now be described. In the case where a projection such as a burr is formed also at the edge part 32 between the two sides parts 30a and 30b of the recess 15a, the above described punch 50 is so shaped that it can carry out pressing and deforming also with respect to the edge part 32. By this expedient, a deformed surface 51c is formed at the edge part 32, which thus deformed inwardly from the outer peripheral surface 11a as shown in FIGS. 6A and 6B. In FIGS. 6A and 6B, those parts which are the same as corresponding parts in FIGS. 4 and 5 are designated by like reference numerals. A description of such parts will be omitted.

Figure 7A:
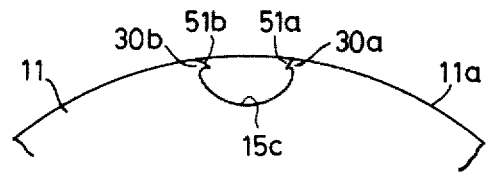
FIGS. 7A and 7B are bottom views respectively showing still other modifications of the recessed part of the rotary guide drum.
Figure 7B:
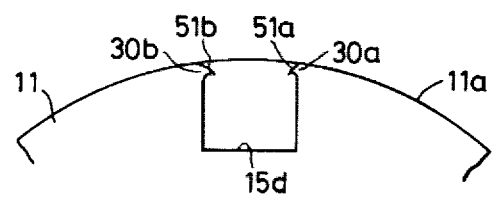

While, the above described embodiment of the invention, the recess 15a of a shape produced by cutting out a portion of a circle, the shape is not thus limited. For example, as shown in FIG. 7A, a recess 15c of a shape produced by cutting out a portion of an ellipse may be used. As another example, the recess may have the shape of a recess 15d as shown in FIG. 7B, which is essentially a square or a rectangle with one portion thereof cut out. The recess may have still other shapes.

In the above embodiment of the invention, the rotary guide head carrier is applied to a two-head type VTR apparatus, and therefore recesses are formed at two positions of the rotary drum 11. In the case of a four-head type VTR apparatus, recesses are formed at four positions in the rotary guide drum 11.

Instead of the above described construction wherein the magnetic heads are mounted on the periphery of a rotary guide drum, an arrangement wherein the magnetic heads are mounted on the periphery of a rotary structure such as a rotary head plate adapted to rotate between upper and lower fixed guide drums may be used. In this case, recesses of the above described character are provided in the rotary structure such as a rotary head plate.

Furthermore, instead of securing the magnetic heads to the rotary structure such as a rotary guide drum or a rotary head plate by means such as screws, a construction wherein the magnetic heads are mounted via interposed piezoelectric elements or the like may be used.

The aforedescribed work of deforming the edge projections can readily be automated. Such an automatic work of deforming the projections can be carried out by an apparatus having, for example, an intermittently rotary turntable on which the rotary structures such as the aforedescribed rotary guide drums are mounted, and, at a specific rotational stopping position, a pair of punches operate simultaneously to carry out the work of deforming simultaneously the edge projections of the recesses 15a and 15b. At this time, at other specific positions on the turntable, rotary structures which have already undergone the projection deforming operation are dismounted, and new rotary structures are mounted. By carrying out the above described operation is synchronism with the intermittent rotation and stopping of the turntable, rotary structures whose edge projections have been uniformly deformed without deviations can be produced in great quantity.

Further, this invention is not limited to these embodiments. Variations and modifications may be made without departing from the scope of the invention.

What is claimed is:

1. A rotary magnetic head carrier for use with a recording medium which normally travels in a given direction, said carrier comprising a rotary structure having a cylindrical outer peripheral surface for contacting said medium, at least one cutout or recess formed in said structure to receive at least one part of a rotary magnetic head to be mounted on and held by the carrier, the recess having an opening part extending in a rotational direction of the rotary structure at the outer peripheral surface of the rotary structure, a leading side part of said recess engaging said medium first and a trailing side part of said recess engaging said medium last when said medium is traveling in said given direction, tip edge parts of said two side parts extending transversely to the rotational direction of the rotary structure and being disposed on opposite sides of the opening part of the recess and defined by and interposed between the outer peripheral surface, and the inner surface of at least the trailing edge of the recess being deformed by being pressed inwardly from the outer peripheral surface so that said tip edge parts do not project outwardly therefrom.

2. A rotary magnetic head carrier as claimed in claim 1 in which a lateral edge part of the opening part extending in the rotational direction of the rotary structure between said two side parts is also deformed by pressing further inwardly from the outer peripheral surface.

3. A rotary magnetic head carrier as claimed in claim 1 in which the recess has, in a region thereof inwardly from the opening part, a part of a width which is greater than the width at the opening part.

4. A rotary magnetic head carrier as claimed in claim 1 in which the recess is formed on one end face side of the rotary structure, and the rotary magnetic head is mounted and held on said one end face side of the rotary structure.

5. A rotary magnetic head carrier as claimed in claim 1 in which, of said two side parts, the side part on the trailing side as considered with respect to the direction of rotation of the rotary structure is deformed over a dimension which is greater than the dimension of deformation of the side part on the leading side.

6. A rotary magnetic head carrier as claimed in claim 1 in which, of said two side parts, the side part on the trailing side as considered with respect to the direction of rotation of the rotary structure is deformed to have a curved surface joining smoothly the outer peripheral surface.

7. A rotary magnetic head carrier as claimed in claim 6 in which, of said two side parts, the side part on the leading side as considered with respect to the direction of rotation of the rotary structure is deformed to have a substantially plane surface with a dimension smaller than the dimension of said curved surface of the side part on the trailing side.

8. A rotary magnetic head carrier as claimed in claim 1 in which the recording medium is a magnetic tape and the rotary structure is a rotary guide drum for rotating with said magnetic tape traveling in a wrapping contact with the outer peripheral surface thereof.

* * * * *